(12) United States Patent
Marx et al.

(10) Patent No.: US 9,396,490 B1
(45) Date of Patent: Jul. 19, 2016

(54) BRAND RESPONSE

(75) Inventors: Matthew G. Marx, Austin, TX (US); Jeffrey Breitenstein, Austin, TX (US)

(73) Assignee: Bazaarvoice, Inc., Austin, TX (US)

( * ) Notice: Subject to any disclaimer, the term of this patent is extended or adjusted under 35 U.S.C. 154(b) by 118 days.

(21) Appl. No.: 13/407,358

(22) Filed: Feb. 28, 2012

(51) Int. Cl.
*G06Q 30/02* (2012.01)
*G06Q 10/06* (2012.01)
*G06Q 30/06* (2012.01)

(52) U.S. Cl.
CPC .................................. *G06Q 30/0282* (2013.01)

(58) Field of Classification Search
CPC .................................................. G06Q 30/0282
USPC .................................................. 705/1.1–912
See application file for complete search history.

(56) References Cited

U.S. PATENT DOCUMENTS

| 5,528,490 | A | 6/1996 | Hill |
| 5,761,649 | A | 6/1998 | Hill |
| 5,999,908 | A | 12/1999 | Abelow |
| 6,029,142 | A | 2/2000 | Hill |
| 6,236,994 | B1 | 5/2001 | Swartz et al. |
| 6,757,682 | B1 | 6/2004 | Naimark et al. |
| 6,785,671 | B1 | 8/2004 | Bailey et al. |
| 6,999,962 | B2 | 2/2006 | Julliard et al. |
| 7,133,834 | B1 | 11/2006 | Abelow |
| 7,143,089 | B2 | 11/2006 | Petras et al. |
| 7,222,078 | B2 | 5/2007 | Abelow |
| 7,343,294 | B1 | 3/2008 | Sandholm et al. |
| 7,409,362 | B2 | 8/2008 | Calabria |
| 7,428,496 | B1 | 9/2008 | Keller et al. |
| 7,433,832 | B1 * | 10/2008 | Bezos et al. .................. 705/26.8 |
| 7,483,846 | B1 * | 1/2009 | Kumar et al. ............... 705/26.43 |
| 7,519,562 | B1 | 4/2009 | Vander Mey et al. |
| 7,620,565 | B2 | 11/2009 | Abelow |
| 7,620,651 | B2 | 11/2009 | Chea et al. |
| 7,720,835 | B2 * | 5/2010 | Ward et al. ..................... 707/710 |
| 7,908,173 | B1 | 3/2011 | Hill |
| 7,908,176 | B1 | 3/2011 | Hill |
| 7,930,363 | B2 | 4/2011 | Chea et al. |
| 7,937,391 | B2 | 5/2011 | Chea et al. |
| 8,001,003 | B1 | 8/2011 | Robinson et al. |
| 8,214,261 | B2 | 7/2012 | Chen et al. |

(Continued)

FOREIGN PATENT DOCUMENTS

| WO | 2007047691 | 4/2007 |
| WO | WO 2007047691 | 4/2007 |

(Continued)

OTHER PUBLICATIONS

61543163_LEFF Provisional Drawings a.*

(Continued)

*Primary Examiner* — Jonathan Ouellette
(74) *Attorney, Agent, or Firm* — Meyertons, Hood, Kivlin, Kowert & Goetzel, P.C.

(57) ABSTRACT

Embodiments described herein provide systems and methods for brand response. One embodiment of a system for providing brand a review system configured to receive customer reviews from a plurality of web sites and provide for display on the web sites responses to the customer reviews inline with the customer reviews. The system can further include a brand response system configured to allow a user associated with a manufacturer to submit a response to a customer review of a product and provide the response to the review system.

20 Claims, 9 Drawing Sheets

(56) References Cited

U.S. PATENT DOCUMENTS

| | | | |
|---|---|---|---|
| 8,321,300 B1 | 11/2012 | Bockius et al. | |
| 2002/0023144 A1 | 2/2002 | Linyard et al. | |
| 2002/0107861 A1 | 8/2002 | Clendinning et al. | |
| 2002/0112035 A1 | 8/2002 | Carey et al. | |
| 2002/0165905 A1 | 11/2002 | Wilson | |
| 2003/0088452 A1 | 5/2003 | Kelly | |
| 2004/0143600 A1 | 7/2004 | Musgrove et al. | |
| 2004/0230511 A1 | 11/2004 | Kannan et al. | |
| 2005/0044197 A1 | 2/2005 | Lai | |
| 2006/0069564 A1 | 3/2006 | Allison et al. | |
| 2006/0129446 A1 | 6/2006 | Ruhl et al. | |
| 2006/0143068 A1 | 6/2006 | Calabria | |
| 2006/0230064 A1 | 10/2006 | Perkowski | |
| 2006/0235966 A1 | 10/2006 | Rossow et al. | |
| 2006/0282326 A1 | 12/2006 | Lombardi | |
| 2007/0050245 A1 | 3/2007 | Humphries et al. | |
| 2007/0078833 A1 | 4/2007 | Chea et al. | |
| 2007/0112760 A1 | 5/2007 | Chea et al. | |
| 2007/0150537 A1 | 6/2007 | Graham | |
| 2007/0169096 A1 | 7/2007 | Chea et al. | |
| 2007/0174247 A1 | 7/2007 | Xu et al. | |
| 2007/0192155 A1 | 8/2007 | Gauger | |
| 2007/0244888 A1 | 10/2007 | Chea et al. | |
| 2007/0266023 A1 | 11/2007 | McAllister et al. | |
| 2008/0004942 A1 | 1/2008 | Calabria | |
| 2008/0005103 A1 | 1/2008 | Ratcliffe et al. | |
| 2008/0005223 A1* | 1/2008 | Flake et al. | 709/203 |
| 2008/0097835 A1 | 4/2008 | Weiser | |
| 2008/0109232 A1* | 5/2008 | Musgrove et al. | 705/1 |
| 2008/0114748 A1* | 5/2008 | Varner | 707/5 |
| 2008/0133488 A1 | 6/2008 | Bandaru et al. | |
| 2008/0140577 A1 | 6/2008 | Rahman et al. | |
| 2008/0189274 A1 | 8/2008 | Mann | |
| 2008/0201643 A1 | 8/2008 | Nagaitis et al. | |
| 2008/0222003 A1 | 9/2008 | Adstedt et al. | |
| 2008/0222531 A1* | 9/2008 | Davidson et al. | 715/736 |
| 2008/0244431 A1 | 10/2008 | Chea et al. | |
| 2008/0301055 A1 | 12/2008 | Borgs et al. | |
| 2009/0037412 A1 | 2/2009 | Bard et al. | |
| 2009/0063247 A1 | 3/2009 | Burgess et al. | |
| 2009/0063288 A1 | 3/2009 | Croes | |
| 2009/0070228 A1 | 3/2009 | Ronen | |
| 2009/0276233 A1 | 11/2009 | Brimhall et al. | |
| 2009/0281870 A1 | 11/2009 | Sun et al. | |
| 2009/0299824 A1 | 12/2009 | Barnes | |
| 2010/0114744 A1* | 5/2010 | Gonen | 705/35 |
| 2010/0114883 A1 | 5/2010 | Chea et al. | |
| 2010/0121849 A1 | 5/2010 | Goeldi | |
| 2010/0131384 A1 | 5/2010 | Chen et al. | |
| 2010/0205549 A1 | 8/2010 | Chen et al. | |
| 2010/0205550 A1 | 8/2010 | Chen et al. | |
| 2011/0093393 A1* | 4/2011 | Chang et al. | 705/50 |
| 2011/0173056 A1* | 7/2011 | D'Alessio et al. | 705/14.16 |
| 2012/0109714 A1 | 5/2012 | Azar | |
| 2012/0179752 A1* | 7/2012 | Mosley et al. | 709/204 |
| 2012/0246014 A1 | 9/2012 | Chen et al. | |
| 2012/0303545 A1* | 11/2012 | Brondstetter et al. | 705/347 |
| 2012/0310831 A1* | 12/2012 | Harris et al. | 705/44 |
| 2013/0007012 A1* | 1/2013 | Selkowe Fertik et al. | 707/748 |
| 2013/0018877 A1* | 1/2013 | Gabriel et al. | 707/723 |
| 2013/0041720 A1* | 2/2013 | Spires | 705/7.32 |
| 2013/0085804 A1* | 4/2013 | Leff et al. | 705/7.29 |

FOREIGN PATENT DOCUMENTS

| | | |
|---|---|---|
| WO | 2007050234 | 5/2007 |
| WO | 2007059096 | 5/2007 |
| WO | WO2007050234 | 5/2007 |
| WO | WO2007059096 | 5/2007 |

OTHER PUBLICATIONS

61543163_LEFF Provisional Drawings b.*
61543163_LEFF Provisional Drawings c.*
61543163_LEFF Provisional Drawings d.*

Notice of Allowance for U.S. Appl. No. 12/243,679, mailed Jul. 5, 2012, 13 pgs.
Corrected Notice of Allowability for U.S. Appl. No. 12/243,679, mailed Jul. 19, 2012, 13 pgs.
Office Action for U.S. Appl. No. 13/492,642, mailed Sep. 11, 2012, 7 pgs.
Office Action for U.S. Appl. No. 12/698,510, mailed Nov. 5, 2012, 24 pgs.
Notice of Allowance for U.S. Appl. No. 12/614,016, mailed May 9, 2012, 4 pgs.
Prospero Unveils New Hosted Community Application for Custom-Branded Rating and Reviews: PR Newswire, New York, Feb. 13, 2006, 1 pg. at http://proquest.umi.com/pqdweb?did =985933201 &sid=15&Fmt=3&clientId= 19649&RQT=309&VName=PQD.
European Search Report for European Patent Application No. 09825479.0, mailed Mar. 27, 2012, 5 pgs.
Office Action for U.S. Appl. No. 12/698,510, mailed Apr. 2, 2012, 26 pgs.
European Search Report in Application No. 10738846.4 dated Jan. 21, 2013, 5 pages.
Office Action in U.S. Appl. No. 13/492,642 dated Feb. 22, 2013, 7 pages.
Office Action in U.S. Appl. No. 12/698,447 issued Jan. 16, 2013, 21 pages.
International Search Report and Written Opinion for International Patent Application No. PCT/US2010/000288, completed Mar. 18, 2010, mailed Mar. 31, 2010, 8 pgs.
Bazaarvoice, "Sephora.com Launches "Ratings & Reviews," Bringing Even More Information Than Ever to Beauty Seekers," San Francisco, CA, Sep. 4, 2008 [retrieved Mar. 18, 2010 from URL: http://bazaarvoice.com/press-room/us-press-room/268-pressreleasephpid67], 2 pgs.
International Search Report and Written Opinion for International Patent Application No. PCT/US2009/063560, mailed Dec. 31, 2009, 7 pgs.
Hoegg, R. et al., "Overview of Business Models for Web 2.0 communities", GeNeMe 2006, Dresden, Germany, Oct. 2006, 17 pgs.
Qui, G. et al. "Incorporate the Syntactic Knowledge in Opinion Mining in User-Generated Content" Zhejiang University, Apr. 22, 2008, 26 pgs.
"User Generated Content, Research Brief", Feb. 2008, produced by Resource Interactive and BazaarVoice, 7 pgs.
Office Action for U.S. Appl. No. 12/614,016, mailed Jul. 28, 2010, 12 pgs.
Office Action for U.S. Appl. No. 12/243,679, mailed Nov. 30, 2010, 14 pgs.
www.Bazaarvoice.com—Overview (http://web.archive.org/web/20070408141819/bazaarvoice.com/overview.html).
www.Bazaarvoice.com—Solution (http://web.archive.org/web/20070409104639/bazaarvoice.com/solution.html).
www.Bazaarvoice.com—Syndicate Voice (http://web.archive.org/web/20070202125252/bazaarvoice.com/SyndicateVoice.html).
Office Action for U.S. Appl. No. 12/614,016, mailed Dec. 22, 2010, 6 pgs.
Office Action for U.S. Appl. No. 12/614,016, mailed Jun. 21, 2011, 7 pgs.
Office Action for U.S. Appl. No. 12/243,679, mailed Aug. 3, 2011, 16 pgs.
"You're It," a blog on tagging at http://www.tagsonomy.com/, printed Dec. 12, 2007, 13 pgs.
Arrington, Michael "Profile: DinnerBuzz," Jun. 2005, 4 pgs., at http:///www.techcrunch.com/2005/07/03/profile-dinnerbuzz/, printed on Dec. 12, 2007.
AdamNation tagging blog posted on Jul. 28, 2005 at http://adam.easyjournal.com/entry.aspx?eid=2632426 printed on Dec. 12, 2007, 5 pgs.
PeerPressure >> Scrumptious blog, dated Mar. 22, 2005, at http://www.allpeers.com/blog/?page_id=71, printed Dec. 12, 2007, 19 pgs.
Golder, Scott A. and Huberman, Bernardo A., "The Structure of Collaborative Tagging Systems," Information Dynamics Lab, HP Labs, Aug. 18, 2005, 8 pgs.

(56) References Cited

OTHER PUBLICATIONS

Arrington, Michael, Amazon Tags, Nov. 14, 2005, at http://www.techcrunch.com/2005/11/14/amazon-tags/, printed Dec. 12, 2007, 7 pgs.

Ugoretz, Joseph, "Three Stars and a Chili Pepper: Social Software, Folksonomy, and User Reviews in the College Context," Academic Commons, Jun. 9, 2006, at http://www.academicommons.org/commons/essagy/Ugoretz-social-software-folksonomy, printed Dec. 12, 2007, 5 pgs.

Beach, David and Gupta, Vivek, Yahoo! Search Blog: Social Commerce via the Shoposphere & Pick Lists, Nov. 14, 2005, at http://www.ysearchblog.com/archives/000214.html, printed Dec. 12, 2007, 4 pgs.

Kroski, Ellyssa, "The Hive Mind: Folksonomies and User-Based Tagging," Dec. 7, 2005, at http://infotangle.blogsome/2005/12/07/the-hive-mind-folksonomies-and-user-based-tagging/, printed Dec. 12, 2007, 15 pgs.

Xu Zhichen, Yun Fu, Jianchang Mao and Difu Su, "Towards the Semantic Web: Collaborative Tag Suggestions," Yahoo! Inc., Santa Clara, CA, 8 pgs, in WWW2006: Proceedings of the Collaborative Web Tagging Workshop, 2006.

Office Action for U.S. Appl. No. 12/614,016, mailed Oct. 26, 2011, 8 pgs.

Office Action for U.S. Appl. No. 12/243,679, mailed Dec. 27, 2011, 15 pgs.

Office Action for U.S. Appl. No. 12/614,016, mailed Feb. 8, 2012, 9 pgs.

Office Action in U.S. Appl. No. 12/698,510 mailed Jun. 18, 2014, 24 pages.

Office Action in U.S. Appl. No. 12/698,510 mailed Jan. 15, 2015, 29 pages.

\* cited by examiner

*FIG. 7*

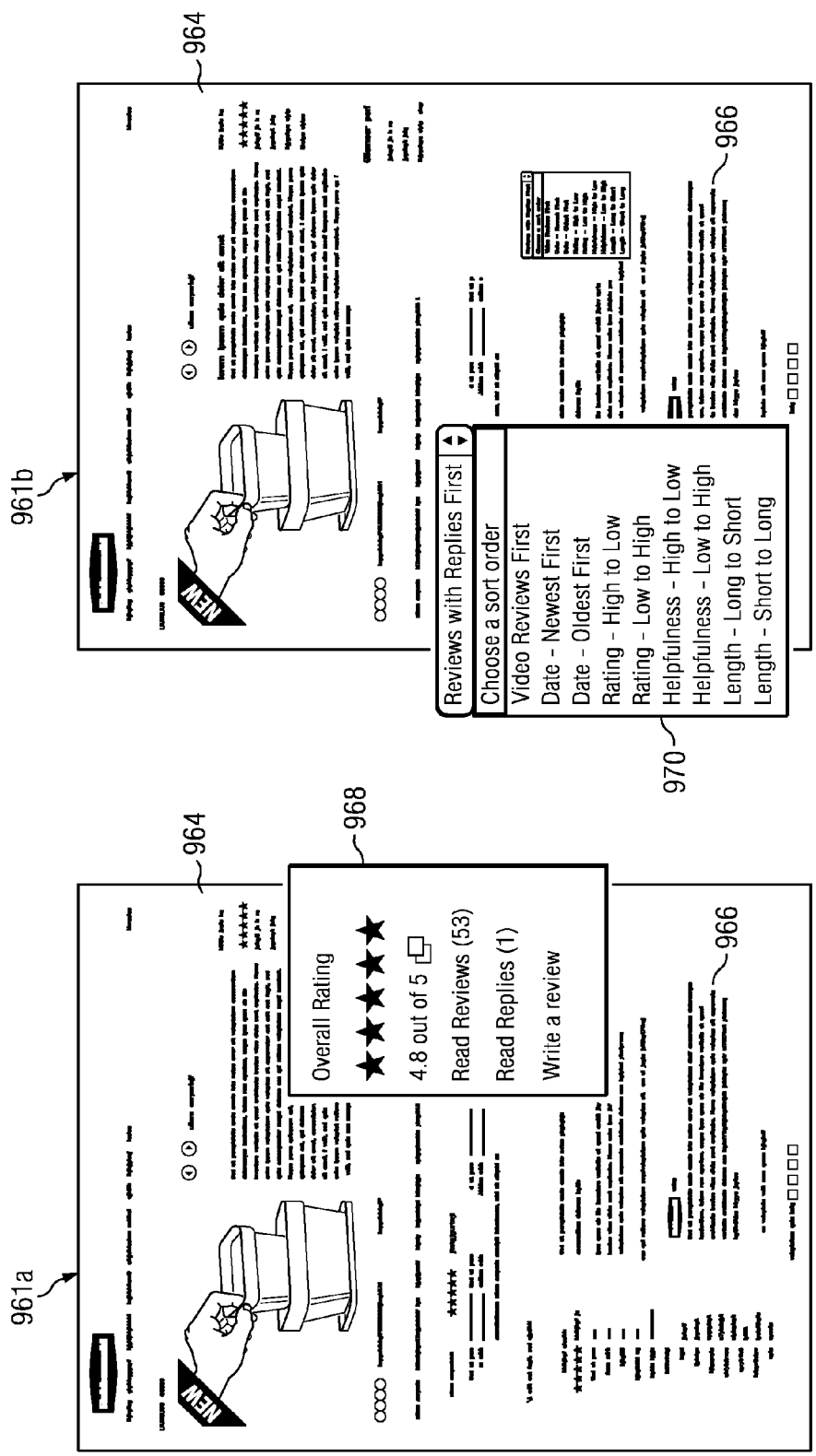

BRAND RESPONSE

TECHNICAL FIELD

This disclosure relates generally to the distribution and inclusion of content. In particular, this disclosure relates to the distribution and inclusion of content in a web page. Even more specifically, this disclosure relates to providing manufacturer responses to user-generated content in an inline attributed fashion.

BACKGROUND

Today's consumer is inundated with advertising. In fact, advertising is so ubiquitous it is often times ignored. What is more, many people lack the belief that companies tell the truth in advertisements. As a result, word of mouth marketing and advertising has become increasingly important with respect to the sales of certain products. Word of mouth refers to the passing of information, especially ratings and reviews, but also general information. In the context of advertising and marketing, the use of word of mouth may mean passing information between consumers or other entities, including manufacturers, experts, retailers, etc. to convey aspects or merits of a product, or the experience one person has related to that product, or related products.

The emergence of the importance of word of mouth marketing and advertising has coincided with the use of the Internet for researching, shopping and purchasing of products. Thus, online marketing and advertising has also become increasingly important. The use of word of mouth marketing in an online setting may therefore be an effective method for such online advertising, as consumer recommendations allow word of mouth advertising to be disseminated either online or offline.

In fact, according to a 2007 global Nielsen survey, consumer recommendations are the most credible form of advertising, as cited by 78% of the study's respondents.

When businesses enable customers, or other types of users, to write reviews, ask or answer questions from the community, or share experiences, they create content that become powerful forms of marketing, and in particular, as discussed above, word of mouth marketing.

This view has been widely reinforced by many operators of web sites including, for example, retailers who report that products with relatively more reviews sell better and are returned less often.

Suppliers of products and services may monitor customer sentiment on a limited number of products on their own web sites. However, they are unable to scale to meet the needs of monitoring broad product catalogs, a problem which is compounded if the products are present in multiple and distributed e-commerce channels.

Further, the current model for user-generated content in the form of reviews and ratings on products and services is one-way. That is, a customer can post a review on an individual retailer or manufacturer web site and others may post subsequent reviews, comment on (or rate the helpfulness of) a previous review, but there is no mechanism for engagement or communication about the product directly from the service supplier, provider, or manufacturer.

Furthermore, while a manufacturer may wish to engage reviewers on a piecemeal basis by leaving follow-up comments, such comments are typically collapsed or otherwise ordered so that a user is required to click a link in order to read them. Moreover, review systems typically do not provide for user icons or avatars or other methods of attribution, i.e., a reader will not necessarily be able to identify the comment as coming from an "official" of the manufacturer.

SUMMARY

Embodiments described herein provide systems and methods for monitoring and engaging customer reviews from multiple, distributed retail channels in a single, centralized location. More particularly, embodiments allow collection, aggregation, and tracking of customer reviews from multiple retailers' web sites. Alerts, including trend and rating alerts, may be sent to a manufacturer based on predetermined criteria. The manufacturer can then respond in an official, branded capacity. The response can be displayed inline in an expanded fashion (i.e., next to the review which prompted the response) and can include official manufacturer identifiers.

One embodiment comprises a system that includes a network, a review system coupled to the network configured to receive over the network customer reviews associated with a plurality of web sites and provide for display on web pages associated with the plurality of web sites responses to the customer reviews inline with the customer reviews. An embodiment can further include a brand response system coupled to the review system. The brand response system can be configured to allow a user associated with the manufacturer to submit a response to a customer review of the product associated with one of the plurality of web sites and provide the response to the review system. The review system may be further configured to provide the review of the product and the response to the review of the product for in-line display in a web page associated with the one of the plurality of web sites.

Another embodiment can include a method for use on one or more computers in a network. The method can include receiving reviews of products associated with a plurality of web sites over the network, allowing a user associated with an entity to submit a response to the customer review, providing the response for display in-line with the review in a web page associated with the retailer web site.

Yet another embodiment can include a brand response system, including one or more programs on tangible machine-readable media. The brand response system may be operable to receive customer reviews of products submitted through web pages from one or more retailer web sites, receive an alert over a network related to a customer review of a manufacturer's products submitted at one of the one or more retailers' websites, and allow a user associated with the manufacturer to provide a response to the customer review. Further, an embodiment of a brand response system may be operable to submit the response to the customer review for display inline with the customer review on a web page associated with the one of the one or more retailers' websites.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore nonlimiting, embodiments illustrated in the drawings, wherein identical reference numerals designate the same components. Note that the features illustrated in the drawings are not necessarily drawn to scale.

FIG. 7 illustrates an exemplary graphical user interface for inputting branded responses.

FIG. 9A and FIG. 9B illustrate exemplary user interfaces for customer content submission and delivery.

DETAILED DESCRIPTION

Figure 1:
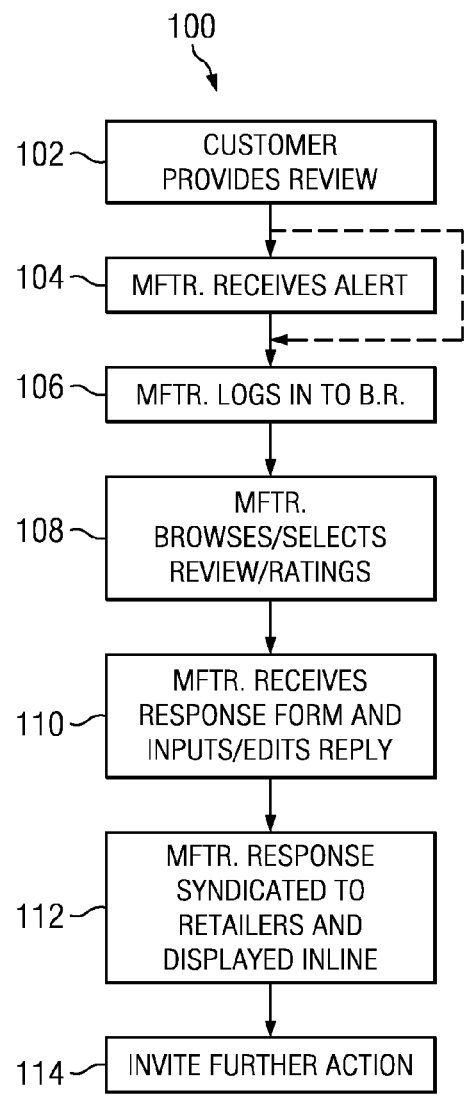
FIG. 1 is an exemplary flowchart illustrating operation of an embodiment of a brand response system.

The invention and the various features and advantageous details thereof are explained more fully with reference to the nonlimiting embodiments that are illustrated in the accompanying drawings and detailed in the following description. Descriptions of well known starting materials, processing techniques, components and equipment are omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure. Embodiments discussed herein can be implemented in suitable computer-executable instructions that may reside on a computer readable medium (e.g., a hard disk (HD)), hardware circuitry or the like, or any combination.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited only those elements but may include other elements not expressly listed or inherent to such process, process, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms. Language designating such nonlimiting examples and illustrations includes, but is not limited to: "for example," "for instance," "e.g.," "in one embodiment."

As discussed above, user-generated content can be an important asset in determining how customers feel about a product and may influence customer purchasing decisions. However, previous review systems, or systems of distributing user-generated content, provided little ability for suppliers or manufacturers to reply or communicate about the products themselves. Embodiments described herein can provide for entities (e.g., suppliers, manufacturers, etc.) to monitor user-generated content and make replies inline, thus directly engaging with the reviewers. By being able to directly address customers' attitudes toward a product and the factors behind those attitudes, the product/service provider can better select products to offer, target marketing or take other actions to increase overall customer satisfaction.

FIG. 1 is a high-level flowchart 100 illustrating a process for collecting, analyzing, aggregating, and responding to user-generated content, such as reviews, in accordance with some embodiments.

Initially (step 102), a customer or customer(s) provide and post review(s) or rating(s) of a product on one or more retailer's web sites (e.g., by providing UGC to the web site or providing UGC to a third party through a web page provided by the retailer's web site). Assuming that the UGC falls below one or more pre-set thresholds, the subscribing manufacturer can receive an alert, such as an email alert, advising of the review (step 102). In some embodiments, the email can include a link to a secure web page and interface for logging in to a brand response system (step 104). In other embodiments, as indicated by the dashed line, a manufacturer may simply log in to the brand response system without receiving an alert.

Once logged in (step 106), if the manufacturer received an alert, he can navigate to or otherwise be presented with the review or rating and formulate a corresponding response (step 108). Alternatively, the manufacturer can simply access the system without having received an alert and browse the review and ratings data and select one or more of the reviews and ratings to respond to.

Once a review or rating entry has been selected, the manufacturer can receive a response form and input and/or edit a response (step 110). The manufacturer's response can be uploaded and syndicated to retailers and displayed inline on the retailer's web pages (step 112). The response can be provided for display in the retailer's web site by providing the comment to the retailer's web site or by providing the comment for display in a web page provided by the retailer's web site without the comment actually going to the retailer's web site. Finally, the customer may be invited (e.g., via an email or other electronic messaging) to update, append, or otherwise follow-up their initial review (step 114). The steps of FIG. 1 can be repeated as needed or desired.

Figure 2:
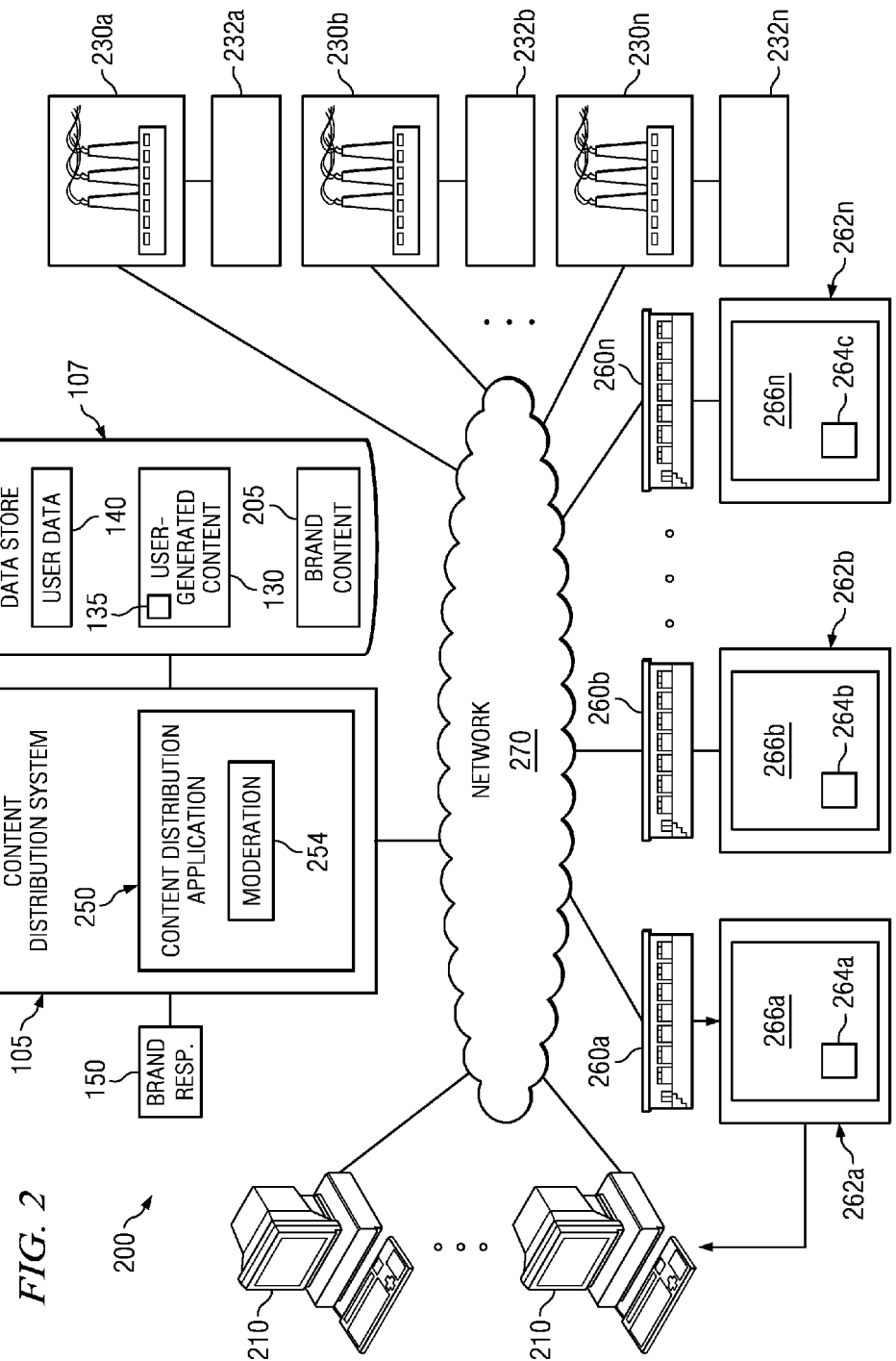
FIG. 2 is a diagrammatic representation of one embodiment a system for replying to user-generated content.

FIG. 2 is a diagrammatic representation of one embodiment a system 100 for collecting, analyzing, and responding to user-generated content, such as reviews and ratings. System 100 collects user-generated content, allows for monitoring thereof, and allows suppliers to browse ratings and reviews, and set and receive alerts according to predetermined criteria.

Manufacturers 230 may produce, wholesale, distribute or otherwise be affiliated with the manufacturer or distribution of one or more products. Retailers 260 may be sales outlets for products made by one or more of manufacturers 230. In fact, in most cases each retailer 260 will sell products from multiple manufacturers 230. These products may be provided for sale in conjunction with one or more web sites (referred to also as sites) 262 (or brick and mortar stores) provided by each of retailers 260 such that users at computing devices 210 may access a web site system (e.g. one or more computing device, which may for example, include one or more web servers) providing the retailer's site 262 over network 270 (for example, the Internet or another type of communications network) in order to purchase these products or perform other actions. In many cases, the retailer web site is at a domain not owned or controlled by the manufacturer.

Retailer site 262 may also offer the ability for a user to generate content with respect to products offered for sale by retailer 260 (or other products). In other words, a user at computing device 210 may utilize the retailer's site 262 to generate user reviews, ratings, comments, problems, issues, question/answers, or almost any other type of content regarding a product or experience with the product, brand, manufacturer or retailer, where this user-generated content 266 may be displayed to other users accessing retailer's site 262.

Reviews may correspond to a user evaluation of a product and include ratings of product (for example, a number of stars or numerical rating), pros and cons of the product, a descriptive title and a description of a user's experience with a product (referred to as the body of the review), attributes of the user generating the review (for example, demographic information), other product(s) which complement or may be used with the product being reviewed, pros and cons of the product or any other type of evaluation of a product or aspects of a user's experience with the product. Reviews may include ratings, such as a number of stars or numerical ratings on a scale of 1 to 10 or other predetermined scales. User generated content generated based on a page associated with a retailer's web site may be associated with the retailer's web site.

Content distribution or review system 105 may be coupled to network 270 and serve to distribute content generated at retailer's site 262, manufacturer's site 232, or another location, to retailers' sites 262 which offers these products or categories of products for sale such that the content generated by a user with respect to that product or category at the retailer's site 262 and the manufacturer's site 232 is incorporated into that retailer's sites 262 where the product, or category of product, is offered. An exemplary content distribution system 105 is described in commonly-assigned, co-pending U.S. patent application Ser. No. 13/407,239, entitled "System, Method and Computer Program Product for Customer Intelligence," which is hereby incorporated by reference in its entirety as if fully set forth herein.

In addition, content distribution system 105 distributes reviews and ratings to manufacturers 230 and to the brand response system 150, as will be discussed in greater detail below. The content distribution system 105 can then receive reply or response content such as comments, etc., back from the manufacturer via the brand response system 150. The responses from the manufacturers 230 can then be distributed to the corresponding retailer 260 for display on the originating retailers' web site 262 in an attributed, inline fashion. Thus, content distribution system 105 may collect user generated content relevant to a manufacturer's (or other entity's) products associated with a plurality of web sites/domains. The content distribution system 105 may also receive comments back from the manufacturer (or other entity) and publish the comments for the web site where a piece of user generated content originated in an attributed, inline fashion.

The system 100 may include one or more computers communicatively coupled to a network 270 and a data store 107. The brand response system may include one or more computers communicatively coupled via a network (network 270 or a second network) to content distribution system 105. In other embodiments, brand response system 150 may share hardware and software with content distribution system 105. Data store 107 may comprise user generated content 130, user data 140, and brand content 205. User generated content 130 may be associated with one or more products or categories, where this user generated content may have been generated at manufacturer's site 232, retailer's site 262 or at another location altogether. User data 140 may comprise information on users who have generated content with respect to a web site. Such information may include user names, email addresses and any other information for a user.

If a user selects to submit a new review, the new user-generated content data can be communicated to content distribution system 105. When new user-generated content is received, content distribution system 105 can add new user-generated content to data store 107. As will be explained in greater detail below, new user-generated content data 130 can be moderated to become part of moderated user-generated content 135.

A brand response system 150 may be provided coupled to or in communication with the content distribution system 105. In particular, the brand response system 150 is coupled to allow tracking and aggregation of user-provided content across various sites and may alert manufacturers to trends and/or predetermined criteria related to a product rating. For example, in some implementations, a retailer or manufacturer may be alerted when a product is given a low rating, such as a one star review; in others, the manufacturer may be alerted when the product is given a five star review. In still others, alerts may be sent based on frequency and trends of particular ratings (e.g., fastest falling rating, fastest rising rating).

Thus, data store 107 may further be used to store brand content 205, i.e., data associated with the particular manufacturer, for example. The brand content 205 may define thresholds, triggers, or other criteria for manufacturer alerting and notification of reviews. This may include, for example, the occurrences of predetermined keywords over time, low ratings, or high ratings, or an unusual deviation from a predetermined average level. In operation, a manufacturer can thus monitor review sources for trends and spot problem areas.

Returning briefly to content distribution system 105, according to one embodiment, both the user generated content displayed on the web page and a content generation tool for the generation of new content may be provided in conjunction with one another. Specifically, in one embodiment, the content from content distribution system 105 or a content generation tool may be incorporated into a portion of the web page of retailer's site 262 using an element such as an iframe or div tag, another type of HTML element or tag, or another type of mechanism altogether, and may be accessed through a variety of elements, such as a tab or link displayed on the web site or the like.

More particularly, in one embodiment, an inclusion module 264 (such as JavaScript or other type of computer instructions) may be included at the retailer's site 262 or associated with a particular web page of the retailer's site. This content distributor inclusion module 264 works in conjunction with content distribution system 105 by making calls back to content distribution system 105 to incorporate the desired content for that page along with a content generation tool.

More particularly, in one embodiment, when a web page 266 from retailer's site 262 is loaded at a user computer 210 the HTML for the page may load, including the element used to incorporate content from the content provider system 105. A content distributor software module 264 (which may have been provided by operators of the content distribution system 105 or implemented by operators of the retailer's site 262) may also load at this time to obtain user generated content (e.g. reviews, stories, etc., as discussed above) for inclusion in the web page 266 in conjunction with the element such that the obtained user generated content can be displayed in the web page 266 of the retailer's site.

In one embodiment, the content distributor software module 264 associated with content distribution system 105 resident on retailer's site 262 may be executed when the web page 266 is loaded. This content distributor software module 264 may send data associated with the web page 266 such as the product data, user data, display codes, etc. content distribution system 105. Content distribution system 105 may utilize this data to determine a set of user generated content 268 from the stored user generated content 130 to return, format this user generated content 268 accordingly and return this user generated content to the calling content distributor software module 264.

The content distributor software module 264 executing on the browser at the user's computer 210 receives content from content distribution system 105 and incorporates the content into the element on the web page 266 configured to display the content. Moreover, the ability to generate additional content may be offered, where the type of content generation opportunity offered may correspond to the type of incorporated content. For example, the opportunity to generate an additional review may be presented along with reviews that have been incorporated in the web page 266 at the retailer's site 262.

When a manufacturer submits a comment on a review, the comment can be linked to the review (e.g., through metadata or otherwise linked to the review). When a content distributor software module 264 next requests user-generated content on the particular product (or category of products), content distribution system 105 can send the reviews with associated manufacturer comments to distributor software module 264. A review with an associated manufacturer comment can be sent in a manner so that distributor software module 264 understands that the review and manufacturer comment are linked and displays the manufacturer comment inline with the review in an expanded fashion without the user having to make an additional request to expand the conversation to show the manufacturer comment (e.g., without clicking a "+" sign or other indicator of collapsed comments to expand the collapsed comments). If there are multiple manufacturer comments linked to a particular review they may all be displayed inline in an expanded fashion, only the first comment displayed inline in an expanded fashion or some portion of the comments displayed inline in an expanded fashion with the review. The manufacturer comments displayed may include branding, contact information or other information that indicates the comment was submitted by the manufacturer.

Thus, in one embodiment, content distribution system 105 can collect UGC from retailers' web sites by receiving UGC submitted through web pages provided by the retailers' sites without the UGC having to go directly to the retailers' sites. In other embodiments, the retailer sites may collect the UGC. Further, in one embodiment, reviews and comments may be provided for display on a retailer site by providing the reviews and comments to end users for inclusion in web pages provided by the retailer site without the retailer site having to directly serve the reviews and comments. In other embodiments, reviews and comments can be provided to the retailer site so that the retailer site can provide the reviews and comments directly to end users.

Figure 3:
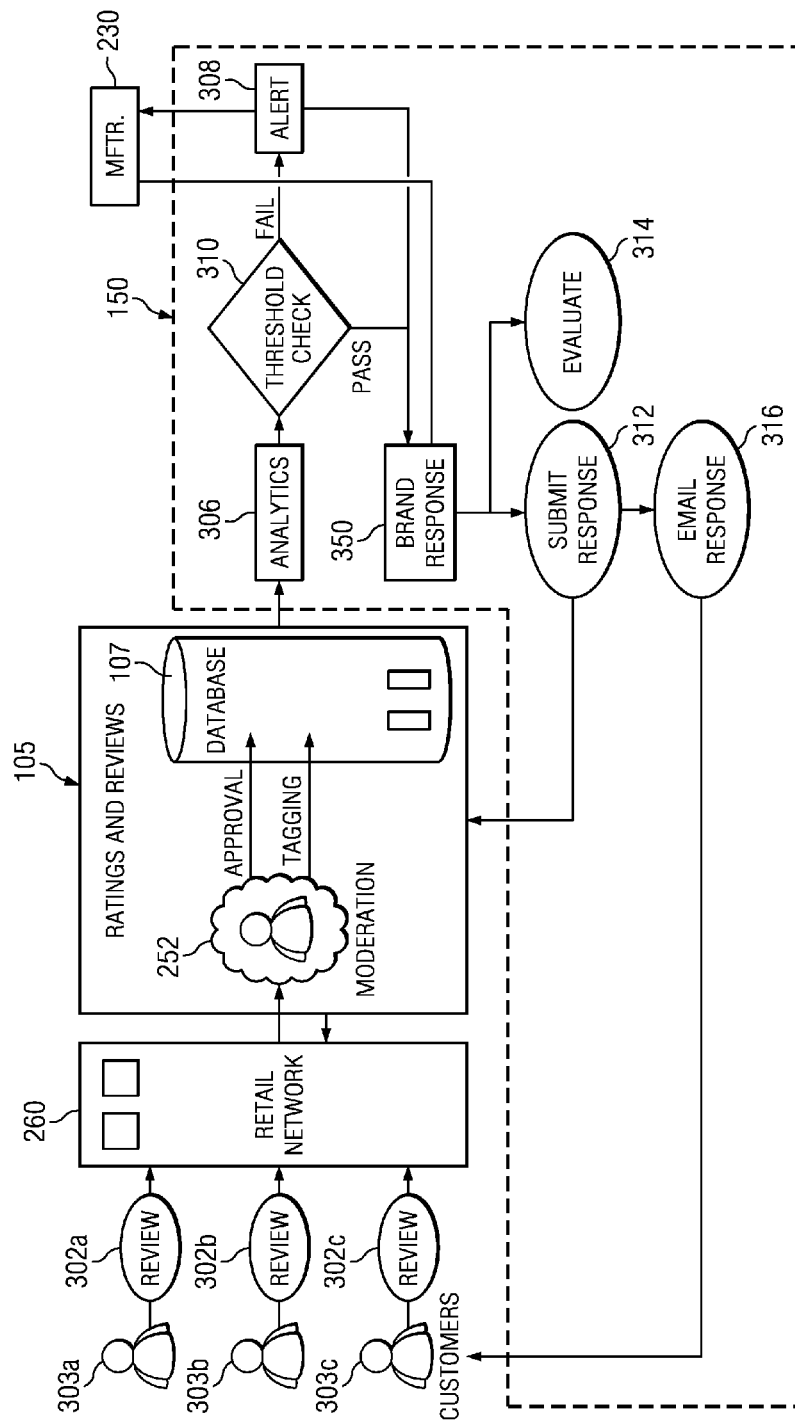
FIG. 3 is a block diagram of one embodiment of a brand response distribution topology.

FIG. 3 illustrates an exemplary brand response architecture more particularly. According to one embodiment, brand response system 150 may include one or more software modules such as analytics 306 and brand response module 350, discussed in greater detail below. The software modules may be implemented as separate programs, portions of a program or according to any suitable programming scheme or software architecture. The functions of a brand response system may be implemented at a single computer or be distributed across multiple computers.

As shown, a plurality of users, typically customers, 303a, 303b, 303c can leave reviews 302a, 302b, 302c on web sites in retail network 260. The retail network 260 may comprise a plurality of retailers who have agreements with the manufacturers and/or providers of the review system 105 to allow communication and/or provision of reviews and responses thereto. In other embodiments, a retailer may host a ratings and reviews service. The reviews can be provided, as discussed above, to the review or content distribution system 105 allowing for entry of ratings, etc. The content distribution system 105 may implement moderation 252 and approved reviews can be stored in the database 107, along with any associated tags, identifying information, etc.

Moderation may include, for example, automatic or manual filtering out reviews that are not relevant to a product, spam, etc. The moderation 252 my further include "standardizing" reviews or ratings to a common format. For example, systems in which five stars reviews and systems in which ten star reviews are given each may be normalized to four stars.

In general, this moderation process may comprise different levels of moderation, including auto processing the user generated content to identify blacklisted users or trusted users; human moderation which may include manually classifying content or content recategorization; proofreading; or almost any other type of moderation desired. According to one embodiment, moderation can include tagging reviews with tags such as "product flaw," "product suggestion," "customer service issue," extraction of keywords, or other tag based on the user-generated content. Note, however, that moderation may or may not be employed in certain embodiments. For example, content from certain manufacturers may not undergo such a moderation process, or may undergo moderation at a different point.

In one embodiment, identifiers associate this user generated content with a manufacturer, products, brand or categories of products offered for sale by retailer 260 or the manufacturer 230, user attributes of the user who generated the content, product attributes, etc. Thus, for example, received user generated content may be associated with a product identifier associated with a particular product or a category identifier associated with a particular category and a user that submitted the user-generated content and the content and the associated identifiers stored in data store 107. In some cases, the moderation process may include associating product reviews for products as identified for the retail web site with products as identified by the manufacturer. In other words, product matching between retailers and manufacturers. In other embodiments, such matching may occur automatically when a review is received.

In operation, reviews and data from the database 107 are provided to one or more analytics units 306, to determine, e.g., whether they match one or more predetermined criteria. For example, as noted above, a trigger may be a one star review or a five star review, or three one star reviews after a series of five star reviews. The trigger may also include the occurrence of one or more tags, the identification of one or more keywords, or a bad keyword after occurrences of good keywords. Triggers may thus include trends in keywords or other criteria. These criteria may be stored as brand content 205 (FIG. 2).

In any event, if a threshold is triggered, the review or reviews are provided to the subscribing manufacturer 230 as an alert 308 and to the brand response module 350, as well. As noted above, the manufacturer may operate one or more computers 232 (FIG. 2) including web browsers or other interfaces for accessing one or more servers provided for or by the content distribution system 105 and/or brand response system 150.

The manufacturer 230 can then access the brand response module 350 to submit a response 312 and/or evaluate 314 what the cause of the alert was. The response is then received back at the content distribution system 105 and is distributed to the site in retail network 260 from which the triggering review or reviews were initially generated. It is noted that, in some embodiments, the brand response system 150 need not be configured to send an alert. In such a system, the manufacturer could simply log in and browse reviews, as will be explained in greater detail below. Further, in some embodiments, the ratings and review data may be aggregated across multiple retailers with brand response system 150 providing a centralized system for responding to reviews; in other embodiments, aggregation may not be provided.

If desired, in some embodiments, the manufacturer's response 312 may generate an email response 316 back to the party or parties whose reviews triggered the alert (This functionality may be enabled by the retailer at the retailer's web site).

Figure 4:
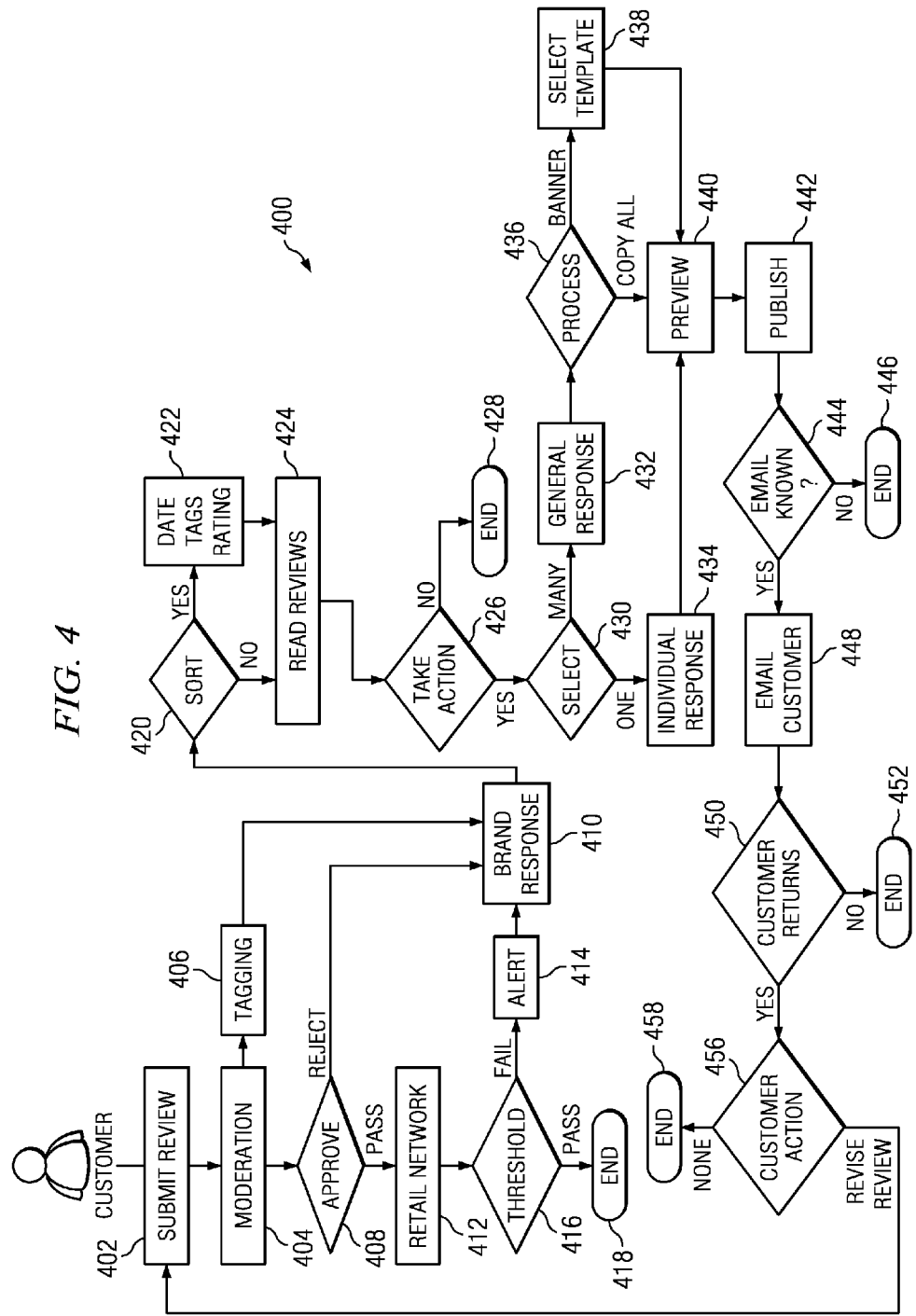
FIG. 4 is a flow diagram illustrating content collection and response.

Turning now to FIG. 4, a diagram 400 illustrating in greater detail process flow for an embodiment of brand response is shown. Initially, as discussed above, a customer may submit a review or other form of customer originated content (step 402). The review or other customer originated content may then be provided to the review or content distribution system for moderation (step 404). The moderation may include tagging (step 406) or other normalization as discussed above. Such tagging may then be provided to the brand response system 150 (step 410).

If approved by moderation (step 408), the comment or review may be additionally passed to the retail network (step 412) for display on the retailer's web site 262. If rejected, the rejection may be passed to the brand response system 150 as well (step 410).

Reviews that are approved may be subjected to one or more threshold checks (step 416). This may include, for example, a number of stars given for a product or a number of keywords and suchlike. If it fails the threshold, an appropriate alert (step 414) may be generated and sent to the manufacturer, who may then log in to the brand response system 150 for processing. Likewise, if it passes the threshold, in some embodiments it may also be provided to the brand response system 150 (step 418) for data analysis.

Once received at the brand response system 150, the review may be sorted (step 420). This can include, for example, sorting by date, by tags, by customer rating, or any other predetermined criteria (step 422). Regardless of whether sorting occurs, the reviews may be provided to be read by the manufacturer (step 424). As noted above, these may be provided responsive to alerts or may simply be made available for browsing. According to one embodiments, the reviews may be provided to the manufacturer for review at a different domain than the domains/web sites with which the reviews are associated.

The reader may elect to take action on behalf of the manufacturer (step 426). If not, the process ends (step 428). If he does decide to take action, then in some embodiments, the reader may select one or many reviews to comment on (step 430).

If a general response is chosen (step 432), then the response can be entered and edited (step 436), for example, using an editor in a web browser, as will be discussed in greater detail below. In some embodiments, the reader may be given the option of entering a general banner reply using a template (step 438) or copying the response inline with the selected multiple parties' initial reviews. In either case, the reader can preview the response (step 440). The reader may then publish the response (step 442). As discussed above, publication may include the brand response system 150 sending the response to the content distribution system for publication on the retail network 260.

If an email address is known for a party to whom the reader is responding (i.e., from the user data 270) and the retailer's website is enabled for social alerts (step 444), then the customer can be emailed, e.g., a notification and link to the response (step 448). Otherwise, the process ends at (step 446).

The email may provide an invitation to revise the review and thus may include a link to the newly published response, which can allow the customer to click and return to the retail site (step 450). If the customer does not, then the process ends at step 452.

Once the customer returns, he may or may not take subsequent action (step 456). For example, he may be satisfied with the response, in which case the process ends at step 458.

The customer may, however, elect to revise or append additional comments to the review or submit a follow-up (step 402). In this case, the manufacturer may receive a reply alert from the brand response system 150.

Figure 5:
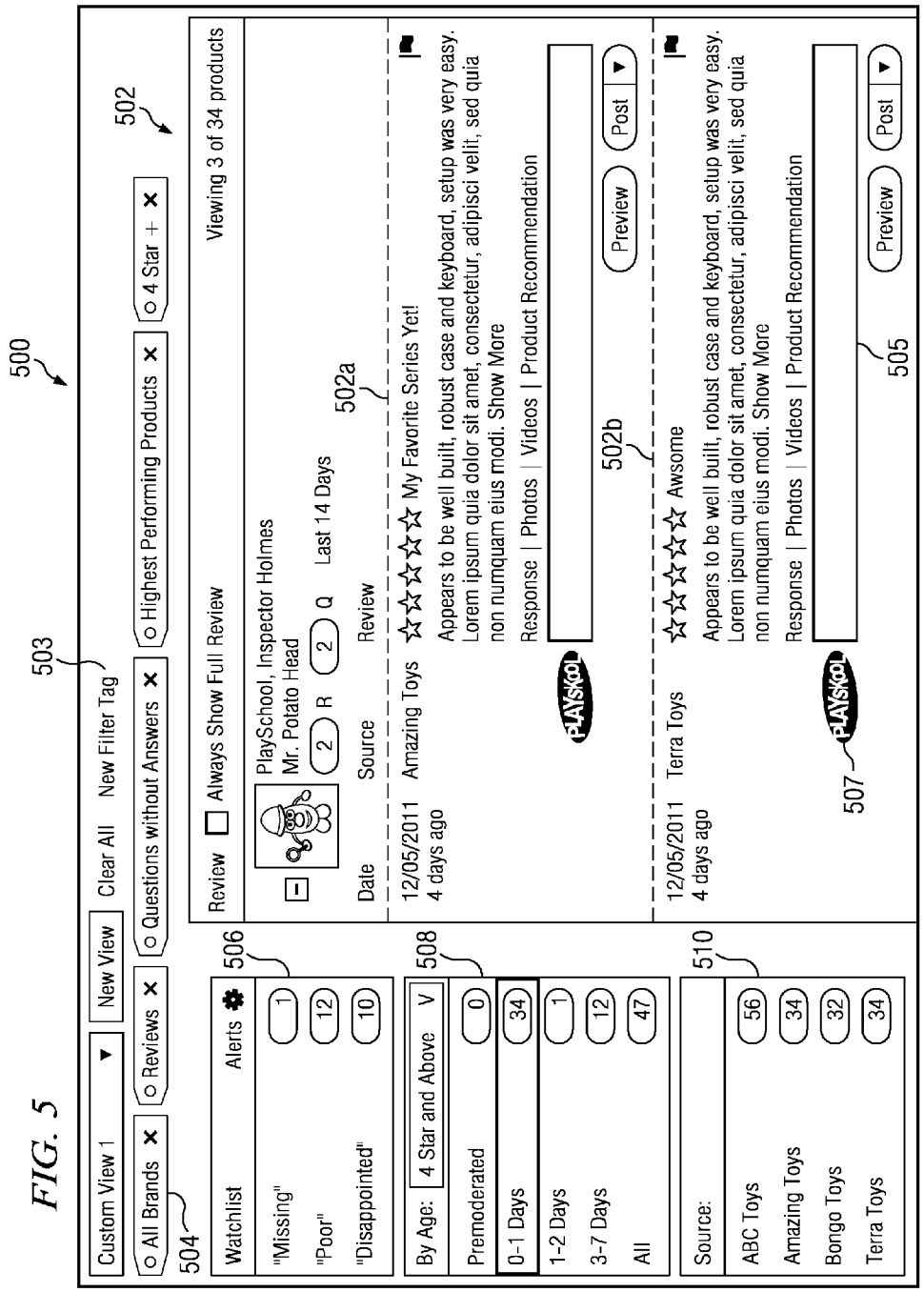
FIG. 5 is an exemplary user interface for viewing and monitoring ratings and reviews, and inputting branded responses.

FIG. 5 illustrates an exemplary brand response user interface 500, showing some of the features that may be available to manufacturers.

A listing of one or more reviews for viewing is shown at 502. The particular listing can be sorted by product or by moderated tags or other criteria 504. In the example illustrated, tags 504 include All Brands, Reviews, Questions without Answers, Highest Performing Products, or 4 Star+and higher. In some embodiments, the manufacturer can elect to view the entirety of a review 502 and is provided with a window 505 for providing a response. The view 502 may also show how the manufacturer's response will be attributed using branding or other information (e.g., at 507).

The user can select operations 503 for viewing based on the tags, such as Custom, New, Clear All, New Filter Tag, etc.

As shown at 506, a user can set a watchlist for alerts. In the example illustrated, these include the keywords or tags "Missing," "Poor," and "Disappointed." In some embodiments, occurrence of such tags will result in the sending of an email alert to the manufacturer. In others, the manufacturer can simply view and click the tags to see corresponding views.

Also, as shown at 508, the manufacturer can sort for viewing by tag and by age of the customer review. In the example illustrated, the tag "4 Star+" is shown in a drop down menu that would allow selection of other tags. The reviews corresponding to the tag may be sorted by age. In particular, they may be sorted by "Premoderated," (i.e., have yet to be released to the retail network), 0-1 days, 1-2 days, 3-7 days, or All. Other age-related sorting criteria may be employed.

Finally, as shown at 510, the manufacturer can see reviews broken out by sources, i.e., retail sources. Typically, identification of the sources and other tags or sorting criteria is viewable with the review 502a, 502b.

Figure 6:
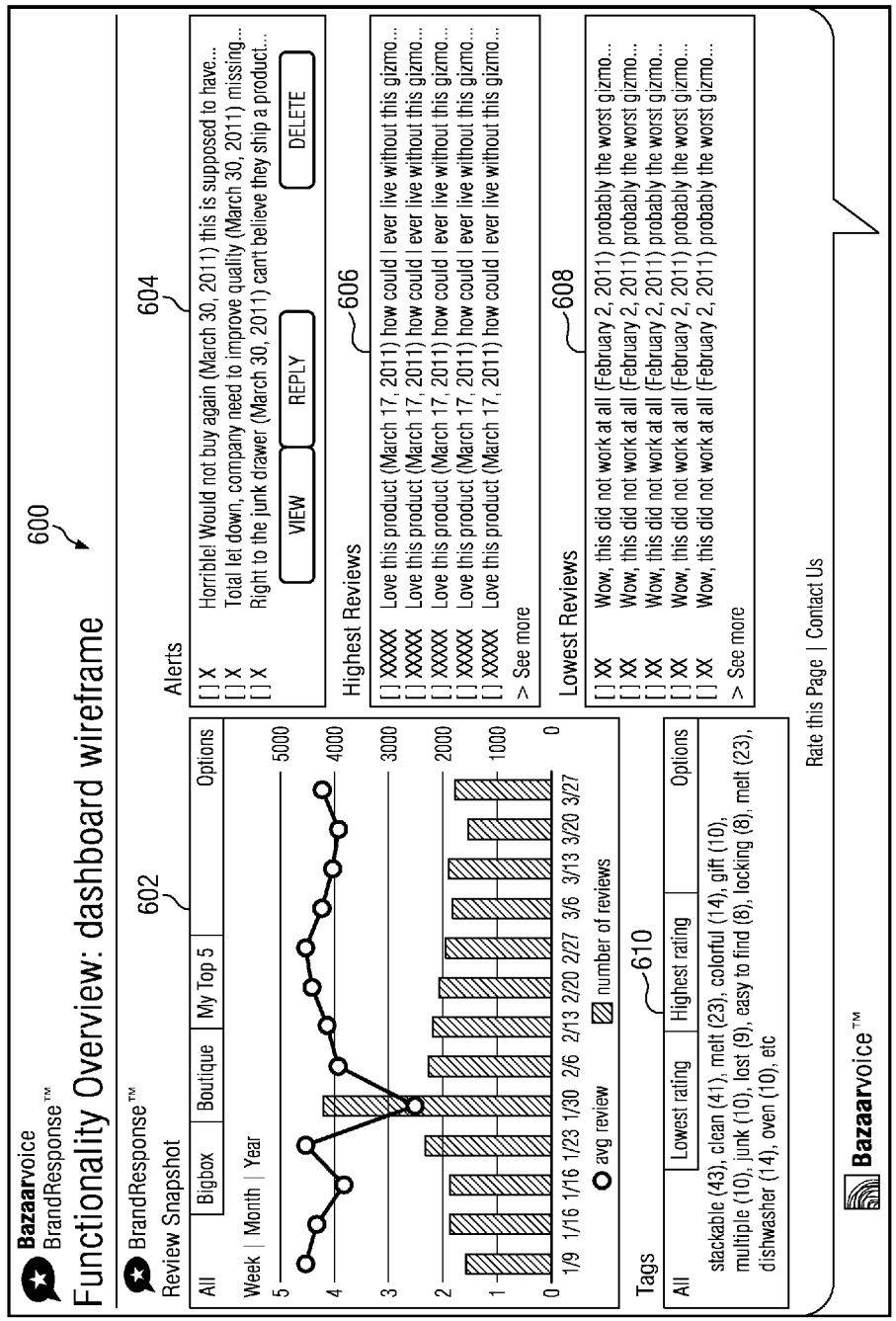
FIG. 6 illustrates exemplary content tracking and alerting.

As noted above, the content brand response system 150 can collect information regarding reviews across a plurality of retailers, web sites, and for a plurality of products. FIG. 6 is a diagram of an exemplary Brand Response "dashboard" 600 that may be used to view and analyze the review and ratings data.

In some embodiments, the dashboard is configurable to enable a manufacturer/supplier to monitor aggregate data on ratings and reviews in product or service context across multiple ecommerce/retail channels.

In particular, dashboard 600 includes time-series data handling for average ratings and review volume 602. The time series data can include options for sorting for greater detail, such as whether the reviews come from a retailer who is a Big Box store, Boutique, etc. In some embodiments, the manufacturer may click on the graph to view corresponding reviews.

The reviews may be identified according to the Alert tags, as shown at 604. That is, a clickable list of those reviews that have identified tags may be provided. In some embodiments, the manufacturer may elect, using the interface 604, to view the review, reply to the review, or delete the alert instance.

Other options may include sorting by highest reviews 606, lowest reviews 608, etc. In some embodiments, the manufacturer may click on and select to read, etc., such reviews.

In addition, lists of tags 610 indicating their frequency may also be provided. Again, the manufacturer may then elect to view all reviews corresponding to the particular tag, respond thereto, etc.

Figure 7:
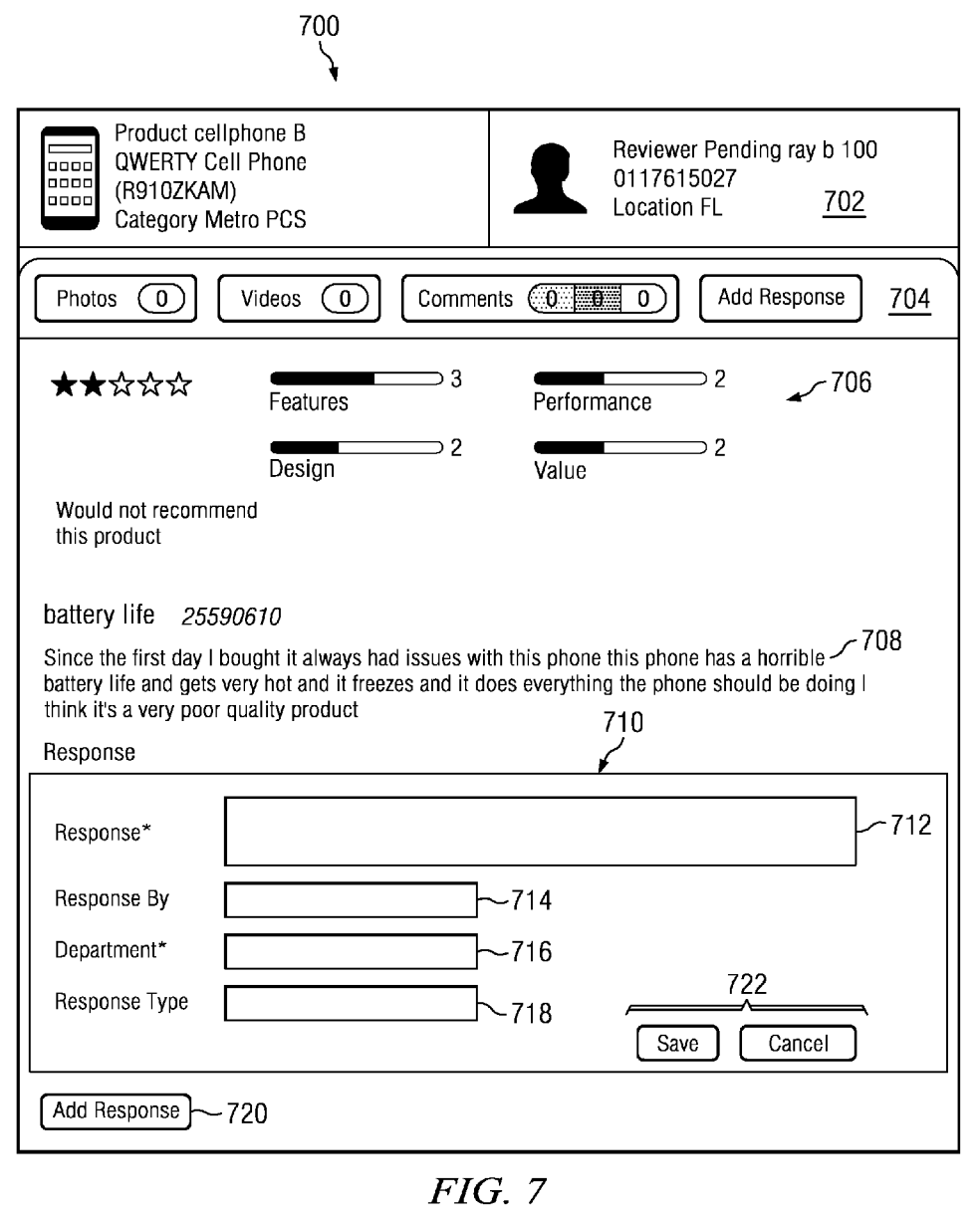

Turning now to FIG. 7, a diagram of an alternate exemplary manufacturer's portal is shown. In particular, the manufacturer's portal 700 is a user interface allowing a manufacturer to enter a reply to a review. Such a user interface may be presented in addition to, or alternatively to, the interface of FIG. 5. Such an interface may be provided, e.g., in response to checking one of the reviews or reply buttons from FIG. 6. Typically, the portal 700 is a web browser interface in communication with a web server providing web pages in conjunction with the content distribution system 105 and/or brand response system 150.

In some embodiments, the portal 700 includes an identification of a product and the status of a given review 702, i.e., whether it is pending or has been published already. Advantageously, by receiving the review prior to publication, a manufacturer can provide an "instant" response. A menu 704 allows the manufacturer to add a response, view comments, etc. One or more additional or duplicate controls 720 may likewise open a field to allow the manufacturer to submit a response. At 706, the reviewer's ratings can be displayed to the manufacturer. Typically, these would be moderated or have normalized ratings, as discussed above. The text of the review is shown at 708.

The manufacturer may be provided with a window and GUI for entering a response, at 710. This can include a text window 712, as well as windows or drop downs that identify who is giving the response 714, which department the response came from 716, and what type of response 718. The manufacturer can then save the response using button 722.

Figure 8:
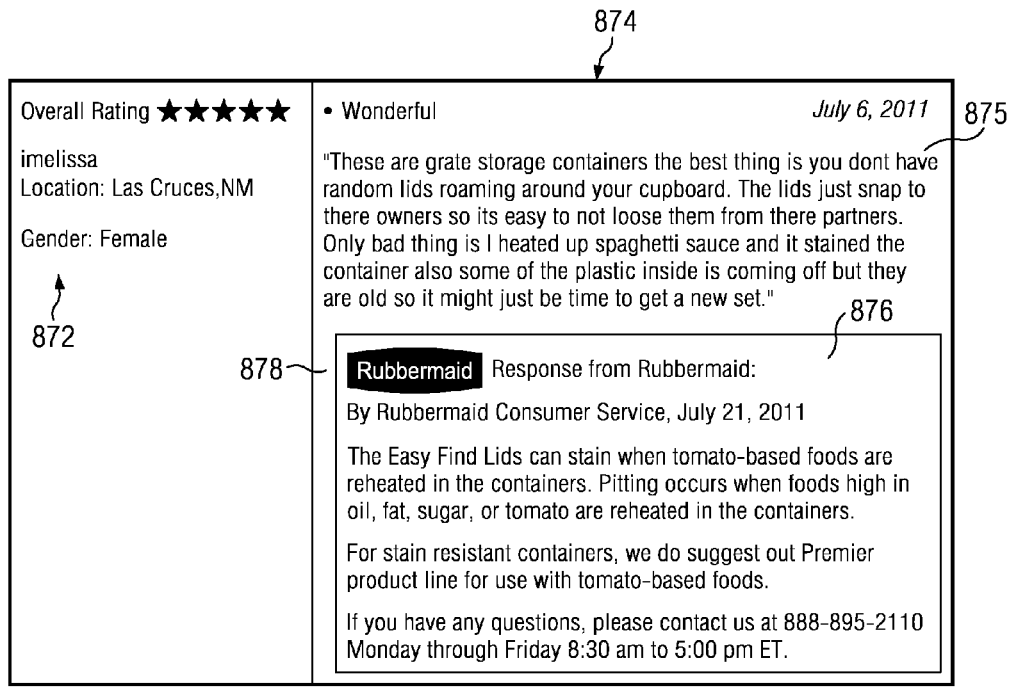
FIG. 8 illustrates exemplary response placement.

FIG. 8 illustrates an exemplary manufacturer's response in more detail. That is, shown is an exemplary display page of how the manufacturer's response 874 would appear on the page of a retailer. In accordance with embodiments as claimed, the response typically would be provided inline, after the original review that prompted the response, and with branding identification.

For example, response 874 includes the original review 875, reviewer identification information 872, and the text of the manufacturer's response 876. As shown, the text of the manufacturer's response 876 is inline in association with the review 875, and includes brand identifiers 878. In this fashion, the reviewer can know that the response is an "official" reply. It is noted that in some embodiments, the response may be added above the reviews or a first response may be provided, with subsequent responses "collapsed" for further viewing.

In some embodiments, users can browse a retailers' web site and access manufacturer's brand responses directly. For example, FIG. 9A illustrates an exemplary response entry point in which a Read Replies link is added to a rating summary block.

Shown at 961a is an exemplary product web page, which includes product information 964 and one or more reviews 966. In addition, a rating summary block 968 indicates ratings of the product, and whether there have been reviews or replies. If there have been manufacturer replies, the user can click and then navigate to the review and the associated reply. That is, the user can click to read reviews and replies and leave a review.

FIG. 9B illustrates an exemplary response entry point in which a Read Replies link is added to a sorting option block. In particular, 961b shows a product page with product information 964 and a review 966. In addition, a sorting block 970 is provided, listing orders of sorting, which can include Reviews with Replies First. If the user clicks the link, all the reviews with manufacturer replies will be displayed first.

Figure 10:
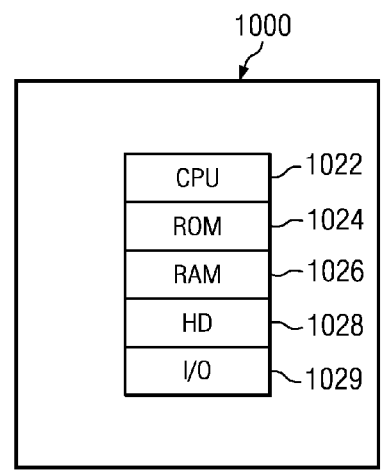
FIG. 10 is a diagram illustrating the components of an exemplary computer system.

Embodiments of the present invention can be implemented in a computer communicatively coupled to a network (for example, the Internet), another computer, or in a standalone computer. As shown in FIG. 10, such a computer 1000 may comprise a central processing unit ("CPU") 1022, read-only memory ("ROM") 1024, random access memory ("RAM") 1026, hard disk drive ("HD") or storage memory 1028, and input/output device(s) ("I/O") 1029. I/O 1029 can include a keyboard, monitor, printer, electronic pointing device (e.g., mouse, trackball, stylus, etc.), or the like. In embodiments of the invention, the computer may have access to at least one database over the network.

The computer 1000 may have more than one CPU, ROM, RAM, HD, I/O, or other hardware components. For simplicity, the computer illustrated in FIG. 10 is depicted in as having one of each of the listed hardware components. It should be noted that FIG. 10 is a simplification of an exemplary hardware configuration. Many other alternative hardware configurations are possible and known to persons of skill in the art.

ROM, RAM, and HD are computer memories for storing computer-executable instructions executable by the CPU or capable of being complied or interpreted to be executable by the CPU. Within this disclosure, the term "computer readable medium" or is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a DASD array, magnetic tape, floppy diskette, optical storage device, or other appropriate computer-readable medium or storage device.

In one exemplary embodiment of the invention, the computer-executable instructions may be lines of C++, Java, JavaScript, HTML, or any other programming or scripting code. Other software/hardware/network architectures may be used. For example, the functions of the present invention may be implemented on one computer or shared among two or more computers.

Additionally, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A system, comprising:
   at least one processor;
   a memory having instructions executable by the at least one processor to cause the system to carry out operations comprising:
      receiving user-generated content from one or more web sites, wherein the user-generated content includes one or more reviews of at least one product or service;
      storing the user-generated content including the one or more reviews in an encoding format suitable for incorporation within a web page;
      based on information indicating that a specified criterion relating to a first one of the one or more reviews is met, generating an alert in a digital format encoding the specified criterion;
      using an electronic messaging protocol to provide the alert to a provider of the at least one product or service;
      subsequent to using the electronic messaging protocol to provide the alert, receiving, from a representative of the provider of the at least one product or service, a response to the first review;
      subsequent to receiving the response, storing the response in the encoding format;
      subsequent to receiving the response, generating an invitation, for a reviewer that corresponds to the first review, in the digital format encoding invitation information inviting the reviewer to reply to the response;
      upon generating, providing the invitation to the reviewer; and
      based on storing the response in the encoding format, instructing a host computer device for a first one of the one or more web sites to incorporate, into source code of a web page of the first web site, the response and an indicator indicating that the response is an official response authorized by the provider, and further instructing the host computer device to display the web page including the response from the representative and the indicator.

2. The system of claim 1, wherein the operations further comprise:
   subsequent to using the electronic messaging protocol to provide the alert, producing to the provider a response template that encodes, in the encoding format, field information indicative of one or more specified categories of content requested for the response and an interface configured to receive the one or more specified categories of content from the provider; and
   wherein storing the response includes storing the one or more specified categories of content in the encoding format.

3. The system of claim 1, wherein the encoding format includes Hypertext Markup Language (HTML).

4. The system of claim 1, wherein in instructing the host computer device for the first web site to incorporate into the source code of the web page the response and the indicator, the operations further comprise instructing the host computer device to modify the source code.

5. A method, comprising:
   receiving, by a computer system, user-generated content from one or more web sites, wherein the user-generated content includes one or more reviews of at least one product or service, wherein each of the one or more reviews include a user-provided rating that is one of a plurality of pre-determined rating options;
   based on receiving the user-generated content, the computer system storing the user-generated content including the one or more reviews in an encoding format suitable for incorporation within a web page;
   determining, by the computer system, that a specified criterion relating to a first one of the one or more reviews is met;
   in response to the determining, the computer system causing a provider of the at least one product or service to be notified with regard to the specified criterion being met;
   subsequent to notifying the provider, the computer system receiving a response to the first one of the one or more reviews from a representative of the provider;
   subsequent to receiving the response, storing, by the computer system, the response in the encoding format;
   subsequent to receiving the response, generating, by the computer system, an invitation in a digital format encoding invitation information inviting a reviewer that corresponds to the first review to reply to the response;
   upon generating, providing, by the computer system the invitation to the reviewer; and
   based on storing the response in the encoding format, the computer system instructing a host computer device for a first one of the one or more web sites to incorporate into source code of a web page of the first web site both the response and an indicator indicating that the response is an official response authorized by the provider and further instructing the host computer device to display the web page including the response from the representative and the indicator.

6. The method of claim 5, wherein the web page displays the review, and wherein the web page displays the response in-line with the review.

7. The method of claim 5, wherein the encoding format is Hypertext Markup Language (HTML), and wherein the method further comprises:
   based on the first review of the at least one product or service, the computer system producing to the representative a response template that encodes, in the encoding format, information indicating one or more specified categories of content requested and a user interface configured to receive the one or more specified categories of content from the representative.

8. The method of claim 5, wherein the specified criterion is at least one of a low rating, a high rating, a predetermined frequency of particular ratings, or a trend of ratings.

9. The method of claim 5, further comprising: the computer system linking the review and the response in the encoding format so that the review and the response are displayable on the web page together.

10. The method of claim 5, further comprising:
    the computer system receiving another response to the review; and the computer system instructing the host computer device to incorporate into the source code of the web page the another response by modifying the source code.

11. The method of claim 5, wherein the invitation includes a link selectable by the reviewer to navigate to the web page displaying the response and the indicator.

12. The method of claim 5, further comprising:
the computer system using an electronic messaging protocol to provide the invitation to the reviewer; and
based on reply information indicating that the reviewer has provided a reply to the response, the computer system instructing the host computer device for the first web site to incorporate the reply into the source code of the web page.

13. The method of claim 5, wherein the indicator that the response is authorized by the provider includes a trademark associated with the provider.

14. The method of claim 5, wherein the indicator that the response is authorized by the provider includes at least one of a logo or brand name associated with the provider.

15. An article of manufacture comprising at least one non-transitory computer readable medium storing instructions executable by a computer system to cause a computer system to perform operations comprising:
receiving user-generated content from one or more web sites, wherein the user-generated content includes one or more reviews of at least one product or service;
storing the user-generated content including the one or more reviews in an encoding format suitable for incorporation within a web page;
in response to determining that a specified criterion relating to one of the one or more reviews of the at least one product or service is met, causing a provider of the at least one product or service to be notified with regard to the specified criterion being met;
subsequent to causing the provider to be notified, receiving a response from a representative of the provider;
associating the response received with a particular one of the one or more reviews included in the user-generated content;
based on the associating, generating an invitation, for a reviewer that corresponds to the particular review, in a digital format encoding invitation information indicating that the reviewer is invited to reply to the response;
upon generating, providing the invitation to the reviewer; and
instructing a host computer device for a first one of the one or more web sites to incorporate into source code of a web page of the first web site the response and an indicator indicating that the response is an official response authorized by the provider and further instructing the host computer device to display the web page to display the response and the indicator.

16. The article of manufacture of claim 15, wherein the operations further comprise:
instructing the web page to incorporate the particular review into a portion of the source code such that the web page displays the particular review and the response together.

17. The article of manufacture of claim 15, wherein the operations further comprise:
producing to the provider a response template that encodes, in the encoding format, information indicating one or more specified categories of content requested and a user interface configured to receive the one or more specified categories of content from the representative.

18. The article of manufacture of claim 15, wherein the operations further comprise:
subsequent to generating the invitation, receiving reply information indicating that the reviewer has updated the particular review.

19. The article of manufacture of claim 15, wherein the operations further comprise:
instructing the host computer device to display the web page including timing information for the response, wherein the timing information indicates a time the response was written.

20. An article of manufacture of claim 15, wherein the operation of associating causes the response to be displayable in-line with the particular review on the web page.

* * * * *